US011449226B2

(12) United States Patent
Hua

(10) Patent No.: US 11,449,226 B2
(45) Date of Patent: Sep. 20, 2022

(54) REORGANIZING DISKS AND RAID MEMBERS TO SPLIT A DISK ARRAY DURING CAPACITY EXPANSION

(71) Applicant: EMC IP HOLDING COMPANY LLC, Hopkinton, MA (US)

(72) Inventor: Kuolin Hua, Natick, MA (US)

(73) Assignee: Dell Products L.P., Hopkinton, MA (US)

( * ) Notice: Subject to any disclaimer, the term of this patent is extended or adjusted under 35 U.S.C. 154(b) by 97 days.

(21) Appl. No.: 17/061,940

(22) Filed: Oct. 2, 2020

(65) Prior Publication Data

US 2022/0107729 A1    Apr. 7, 2022

(51) Int. Cl.
*G06F 3/06*    (2006.01)
(52) U.S. Cl.
CPC .......... *G06F 3/0604* (2013.01); *G06F 3/0644* (2013.01); *G06F 3/0689* (2013.01)
(58) Field of Classification Search
CPC ........ G06F 3/06; G06F 3/0604; G06F 3/0644; G06F 3/0689
USPC ......................................................... 711/154
See application file for complete search history.

(56) References Cited

U.S. PATENT DOCUMENTS

| 5,303,244 A * | 4/1994 | Watson ............... G06F 11/1076 |
| | | 714/E11.034 |
| 11,010,076 B2 * | 5/2021 | Bennett .................. G11C 29/52 |

OTHER PUBLICATIONS

Patterson; David et al. A Case for Redundant Arrays of Inexpensive Disks (RAID), Association for Computing Machinery (1988) (Year: 1988).*

* cited by examiner

*Primary Examiner* — Michael Krofcheck
(74) *Attorney, Agent, or Firm* — Anderson Gorecki LLP

(57) ABSTRACT

A drive cluster with RAID (D+P) protection groups initially has D+P=W drives and W partitions. One protection group is created in each partition of the original drive cluster. The original drive cluster is scaled by selecting RAID protection group members starting with a first partition of the new drive and characterized by decrementing drive numbers and incrementing partition numbers, relocating the selected RAID protection group members within partitions such that a selected RAID protection group member on partition X of an existing drive is relocated to partition X of the new drive, and creating a new protection group in vacated partitions and the first partition of the new drive. The scaled drive cluster is split into independent smaller drive clusters when there are at least 2*W drives. RAID protection group members are relocated between a first smaller cluster that comprises sequentially numbered drives (W/2)+1 to (W/2)+W and a second smaller cluster that comprises the remaining drives until the second smaller cluster has the initial protection group distribution of the original drive cluster.

20 Claims, 18 Drawing Sheets

Drive Cluster 250

| Drive\Partition | 1 | 2 | 3 | 4 |
|---|---|---|---|---|
| 1 | A | B | C | D |
| 2 | A | B | C | D |
| 3 | A | B | C | D |
| 4 | A | B | C | D |

Figure 4A

| Drive\Partition | 1 | 2 | 3 | 4 |
|---|---|---|---|---|
| 1 | A | B | C | D |
| 2 | A | B | C | D |
| 3 | A | B | C | D |
| 4 | A | B | C | D |
| 5 |   |   |   |   |

Figure 4B

| Drive\Partition | 1 | 2 | 3 | 4 |
|---|---|---|---|---|
| 1 | A | B | C | D |
| 2 | A | B | C |   |
| 3 | A | B |   | D |
| 4 | A |   | C | D |
| 5 |   | B | C | D |

Figure 5A

| Drive\Partition | 1 | 2 | 3 | 4 |
|---|---|---|---|---|
| 1 | A | B | C | D |
| 2 | A | B | C | E |
| 3 | A | B | E | D |
| 4 | A | E | C | D |
| 5 | E | B | C | D |

Figure 5B

| Drive\Partition | 1 | 2 | 3 | 4 |
|---|---|---|---|---|
| 1 | A | B | C | D |
| 2 | A | B | C | E |
| 3 | A | B | E | D |
| 4 | A | E | C | D |
| 5 | E | B | C | D |
| 6 |   |   |   |   |

Figure 6A

| Drive\Partition | 1 | 2 | 3 | 4 |
|---|---|---|---|---|
| 1 | A | B | C | D |
| 2 | A | B | C | E |
| 3 | A | B | E |   |
| 4 | A | E |   | D |
| 5 | E |   | C | D |
| 6 |   | B | C | D |

Figure 6B

| Drive\Partition | 1 | 2 | 3 | 4 |
|---|---|---|---|---|
| 1 | A | B | C | D |
| 2 | A | B | C | E |
| 3 | A | B | E | F |
| 4 | A | E | F | D |
| 5 | E | F | C | D |
| 6 | F | B | C | D |

Figure 7A

| Drive\Partition | 1 | 2 | 3 | 4 |
|---|---|---|---|---|
| 1 | A | B | C | D |
| 2 | A | B | C | E |
| 3 | A | B | E | F |
| 4 | A | E | F | D |
| 5 | E | F | C | D |
| 6 | F | B | C | D |
| 7 |   |   |   |   |

Figure 7B

| Drive\Partition | 1 | 2 | 3 | 4 |
|---|---|---|---|---|
| 1 | A | B | C | D |
| 2 | A | B | C | E |
| 3 | A | B | E | F |
| 4 | A | E | F |   |
| 5 | E | F |   | D |
| 6 | F |   | C | D |
| 7 |   | B | C | D |

Figure 8A

| Drive\Partition | 1 | 2 | 3 | 4 |
|---|---|---|---|---|
| 1 | A | B | C | D |
| 2 | A | B | C | E |
| 3 | A | B | E | F |
| 4 | A | E | F | G |
| 5 | E | F | G | D |
| 6 | F | G | C | D |
| 7 | G | B | C | D |

Figure 8B

| Drive\Partition | 1 | 2 | 3 | 4 |
|---|---|---|---|---|
| 1 | A | B | C | D |
| 2 | A | B | C | E |
| 3 | A | B | E | F |
| 4 | A | E | F | G |
| 5 | E | F | G | D |
| 6 | F | G | C | D |
| 7 | G | B | C | D |
| 8 |   |   |   |   |

Figure 9A

Drive Cluster 254

| Drive\Partition | 1 | 2 | 3 | 4 |
|---|---|---|---|---|
| 1 | A | B | C | D |
| 2 | A | B | C | E |
| 7 | G | B | C | D |
| 8 |   |   |   |   |

Drive Cluster 252

| Drive\Partition | 1 | 2 | 3 | 4 |
|---|---|---|---|---|
| 3 | A | B | E | F |
| 4 | A | E | F | G |
| 5 | E | F | G | D |
| 6 | F | G | C | D |

Figure 9B

Drive Cluster 254

| Drive\Partition | 1 | 2 | 3 | 4 |
|---|---|---|---|---|
| 1 | A | B | C | D |
| 2 | A | B | C | E |
| 7 | G | B | C | D |
| 8 | A | B | C | D |

Drive Cluster 252

| Drive/Partition | 1 | 2 | 3 | 4 |
|---|---|---|---|---|
| 3 |   |   | E | F |
| 4 | A | E | F | G |
| 5 | E | F | G | D |
| 6 | F | G |   |   |

Figure 10A

Drive Cluster 254

| Drive/Partition | 1 | 2 | 3 | 4 |
|---|---|---|---|---|
| 1 | A | B | C | D |
| 2 | A | B | C |   |
| 7 |   | B | C | D |
| 8 | A | B | C | D |

Drive Cluster 252

| Drive/Partition | 1 | 2 | 3 | 4 |
|---|---|---|---|---|
| 3 | G |   | E | F |
| 4 | A | E | F | G |
| 5 | E | F | G | D |
| 6 | F | G |   | E |

Figure 10B

| Drive/Partition | 1 | 2 | 3 | 4 |
|---|---|---|---|---|
| 1 | A | B | C | D |
| 2 | A | B | C | D |
| 7 | A | B | C | D |
| 8 | A | B | C | D |

Drive Cluster 254

| Drive/Partition | 1 | 2 | 3 | 4 |
|---|---|---|---|---|
| 3 | G |   | E | F |
| 4 |   | E | F | G |
| 5 | E | F | G |   |
| 6 | F | G |   | E |

Drive Cluster 252

Figure 11

| Drive/Partition | 1 | 2 | 3 | 4 | 5 | 6 | 7 |
|---|---|---|---|---|---|---|---|
| 1 | A | B | C | D | E | F | G |
| 2 | A | B | C | D | E | F | H |
| 3 | A | B | C | D | E | H | I |
| 4 | A | B | C | D | H | I | J |
| 5 | A | B | C | H | I | J | K |
| 6 | A | B | H | I | J | K | L |
| 7 | A | H | I | J | K | L | G |
| 8 | H | I | J | K | L | F | G |
| 9 | I | J | K | L | E | F | G |
| 10 | J | K | L | D | E | F | G |
| 11 | K | L | C | D | E | F | G |
| 12 | L | B | C | D | E | F | G |

Figure 12

| Drive/Partition | 1 | 2 | 3 | 4 | 5 | 6 | 7 |
|---|---|---|---|---|---|---|---|
| 1  | A | B | C | D | E | F | G |
| 2  | A | B | C | D | E | F | H |
| 3  | A | B | C | D | E | H | I |
| 11 | K | L | C | D | E | F | G |
| 12 | L | B | C | D | E | F | G |
| 13 |   |   |   |   |   |   |   |
| 14 |   |   |   |   |   |   |   |

Drive Cluster 264

| Drive/Partition | 1 | 2 | 3 | 4 | 5 | 6 | 7 |
|---|---|---|---|---|---|---|---|
| 4  | A | B | C | D | H | I | J |
| 5  | A | B | C | H | I | J | K |
| 6  | A | B | H | I | J | K | L |
| 7  | A | H | I | J | K | L | G |
| 8  | H | I | J | K | L | F | G |
| 9  | I | J | K | L | E | F | G |
| 10 | J | K | L | D | E | F | G |

Drive Cluster 262

Figure 13

| Drive/Partition | 1 | 2 | 3 | 4 | 5 | 6 | 7 |
|---|---|---|---|---|---|---|---|
| 1 | A | B | C | D | E | F | G |
| 2 | A | B | C | D | E | F | H |
| 3 | A | B | C | D | E | H | I |
| 11 | K | L | C | D | E | F | G |
| 12 | L | B | C | D | E | F | G |
| 13 | A | B | C | D | E | F | G |
| 14 | A | B | C | D | E | F | G |

| Drive/Partition | 1 | 2 | 3 | 4 | 5 | 6 | 7 |
|---|---|---|---|---|---|---|---|
| 4 |   |   |   |   | H | I | J |
| 5 |   |   |   | H | I | J | K |
| 6 | A | B | H | I | J | K | L |
| 7 | A | H | I | J | K | L | G |
| 8 | H | I | J | K | L | F | G |
| 9 | I | J | K | L |   |   |   |
| 10 | J | K | L |   |   |   |   |

Figure 14

| Drive/Partition | 1 | 2 | 3 | 4 | 5 | 6 | 7 |
|---|---|---|---|---|---|---|---|
| 1 | A | B | C | D | E | F | G |
| 2 | A | B | C | D | E | F | |
| 3 | A | B | C | D | E | | |
| 11 | | | C | D | E | F | G |
| 12 | | B | C | D | E | F | G |
| 13 | A | B | C | D | E | F | G |
| 14 | A | B | C | D | E | F | G |

| Drive/Partition | 1 | 2 | 3 | 4 | 5 | 6 | 7 |
|---|---|---|---|---|---|---|---|
| 4 | K | L | | | H | I | J |
| 5 | L | | | H | I | J | K |
| 6 | A | B | H | I | J | K | L |
| 7 | A | H | I | J | K | L | G |
| 8 | H | I | J | K | L | F | G |
| 9 | I | J | K | L | | | H |
| 10 | J | K | L | | | H | I |

Figure 15

| Drive/Partition | 1 | 2 | 3 | 4 | 5 | 6 | 7 |
|---|---|---|---|---|---|---|---|
| 1 | A | B | C | D | E | F | G |
| 2 | A | B | C | D | E | F | G |
| 3 | A | B | C | D | E | F | G |
| 11 | A | B | C | D | E | F | G |
| 12 | A | B | C | D | E | F | G |
| 13 | A | B | C | D | E | F | G |
| 14 | A | B | C | D | E | F | G |

Drive Cluster 266

| Drive/Partition | 1 | 2 | 3 | 4 | 5 | 6 | 7 |
|---|---|---|---|---|---|---|---|
| 4 | K | L | M | N | H | I | J |
| 5 | L | M | N | H | I | J | K |
| 6 | M | N | H | I | J | K | L |
| 7 | N | H | I | J | K | L | M |
| 8 | H | I | J | K | L | M | N |
| 9 | I | J | K | L | M | N | H |
| 10 | J | K | L | M | N | H | I |

Drive Cluster 268

Figure 16

REORGANIZING DISKS AND RAID MEMBERS TO SPLIT A DISK ARRAY DURING CAPACITY EXPANSION

TECHNICAL FIELD

The subject matter of this disclosure is generally related to data storage and more particularly to data storage systems that implement RAIDs (Redundant Arrays of Independent Drives).

BACKGROUND

Data storage system implement protection groups to help avoid data loss by enabling a failing or failed protection group member to be reconstructed. Individual disk drives within a drive cluster are often used as protection group members, e.g. members of a RAID protection group. A RAID (D+P) protection group has D data members and P parity members. The data members store data. The parity members store parity information such as XORs of data values. The parity information enables reconstruction of data in the event that a data member fails. Parity information can be reconstructed from the data on the data members in the event that a parity member fails. A failed protection group member is typically reconstructed on a spare drive.

It is sometimes necessary to increase the total storage capacity of a data storage system that is in service. The storage capacity of a drive cluster that uses individual drives as protection group members may be increased by adding a new protection group, e.g. W drives for a drive cluster with RAID (D+P) protection groups where W=(D+P). A drive cluster that implements RAID-5 (4+1), for example, may be scaled-up in increments of five new drives. Similarly, a drive cluster that implements RAID-5 (3+1) may be scaled-up in increments of four new drives. One drawback of scaling storage capacity in increments of W new drives is that it may introduce excess storage capacity that will not be utilized within a reasonable timeframe. Another drawback is that the risk of data loss increases as the number of drives in a drive cluster increases. Drive failure initiates a race condition between rebuilding a failed drive and failure of a second drive in the same protection group. If a second drive fails before the first drive is rebuilt, then multiple members of the protection group become unavailable and data loss can occur. The likelihood of a second drive failing before a first drive is rebuilt increases as the number of drives in the cluster increases.

SUMMARY

Aspects of the present disclosure include scaling of a drive cluster in single drive increments and splitting of a drive cluster into multiple drive clusters to manage the total number of drives in a cluster. All examples, aspects and features mentioned in this document can be combined in any technically possible way.

In accordance with some aspects an apparatus comprises: at least one compute node comprising a processor and non-transitory memory; drives that are managed by the at least one compute node; and a drive cluster manager configured to sequentially number a first cluster of W of the drives, organize each of the W drives into W partitions each having a fixed-size amount of storage capacity equal to storage capacity of other partitions of the first cluster, implement redundant arrays of independent drives (RAID) each having D+P=W RAID protection group members having an initial distribution to the partitions such that each partition of the first cluster contains members of a single RAID protection group, scale the first cluster at least until there are 2*W drives, and split the scaled first cluster into a first smaller cluster that comprises sequentially numbered drives (W/2)+1 to (W/2)+W and a second smaller cluster that comprises remaining drives, and adapt the second smaller cluster for scaling by adding more new drives.

In accordance with some aspects a method for scaling storage capacity of a storage array that comprises at least one compute node comprising a processor and non-transitory memory and drives that are managed by the at least one compute node comprises: sequentially numbering a first cluster of W of the drives; organizing each of the W drives into W partitions each having a fixed-size amount of storage capacity equal to storage capacity of other partitions of the first cluster; implementing redundant arrays of independent drives (RAID) each having D+P=W RAID protection group members having an initial distribution to the partitions such that each partition of the first cluster contains members of a single RAID protection group; scaling the first cluster at least until there are 2*W drives; splitting the scaled first cluster into a first smaller cluster that comprises sequentially numbered drives (W/2)+1 to (W/2)+W and a second smaller cluster that comprises remaining drives; and adapting the second smaller cluster for scaling by adding more new drives.

In accordance with some aspects a computer-readable storage medium that stores instructions that when executed by a compute node of a storage array cause the storage array to perform a method for scaling storage capacity of the storage array, the method comprising: sequentially numbering a first cluster of W drives; organizing each of the W drives into W partitions each having a fixed-size amount of storage capacity equal to storage capacity of other partitions of the first cluster; implementing redundant arrays of independent drives (RAID) each having D+P=W RAID protection group members having an initial distribution to the partitions such that each partition of the first cluster contains members of a single RAID protection group; scaling the first cluster at least until there are 2*W drives; splitting the scaled first cluster into a first smaller cluster that comprises sequentially numbered drives (W/2)+1 to (W/2)+W and a second smaller cluster that comprises remaining drives; and adapting the second smaller cluster for scaling by adding more new drives.

Other aspects, features, and implementations may become apparent in view of the detailed description and figures.

BRIEF DESCRIPTION OF THE FIGURES

FIG. 4A is a matrix representation of the drive cluster of FIG. 3.

FIGS. 4B, 5A, and 5B illustrate expansion of the original drive cluster with a first new drive.

FIGS. 6A, 6B, and 7A illustrate expansion of the drive cluster with a second new drive.

FIGS. 7B, 8A, and 8B illustrate expansion of the drive cluster with a third new drive.

FIG. 9A illustrates expansion of the drive cluster with a fourth new drive that enables the drive cluster to be split.

FIG. 9B illustrates two smaller drive clusters that result from splitting the larger drive cluster of FIG. 9A.

FIGS. 10A, 10B, and 11 illustrate reorganization of RAID members to prepare one of the smaller drive clusters for future scaling and splitting.

FIGS. 12, 13, 14, 15, and 16 illustrate a drive cluster with multiple RAID (6+1) protections groups being scaled, split and reorganized during capacity expansion.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Figure 1:
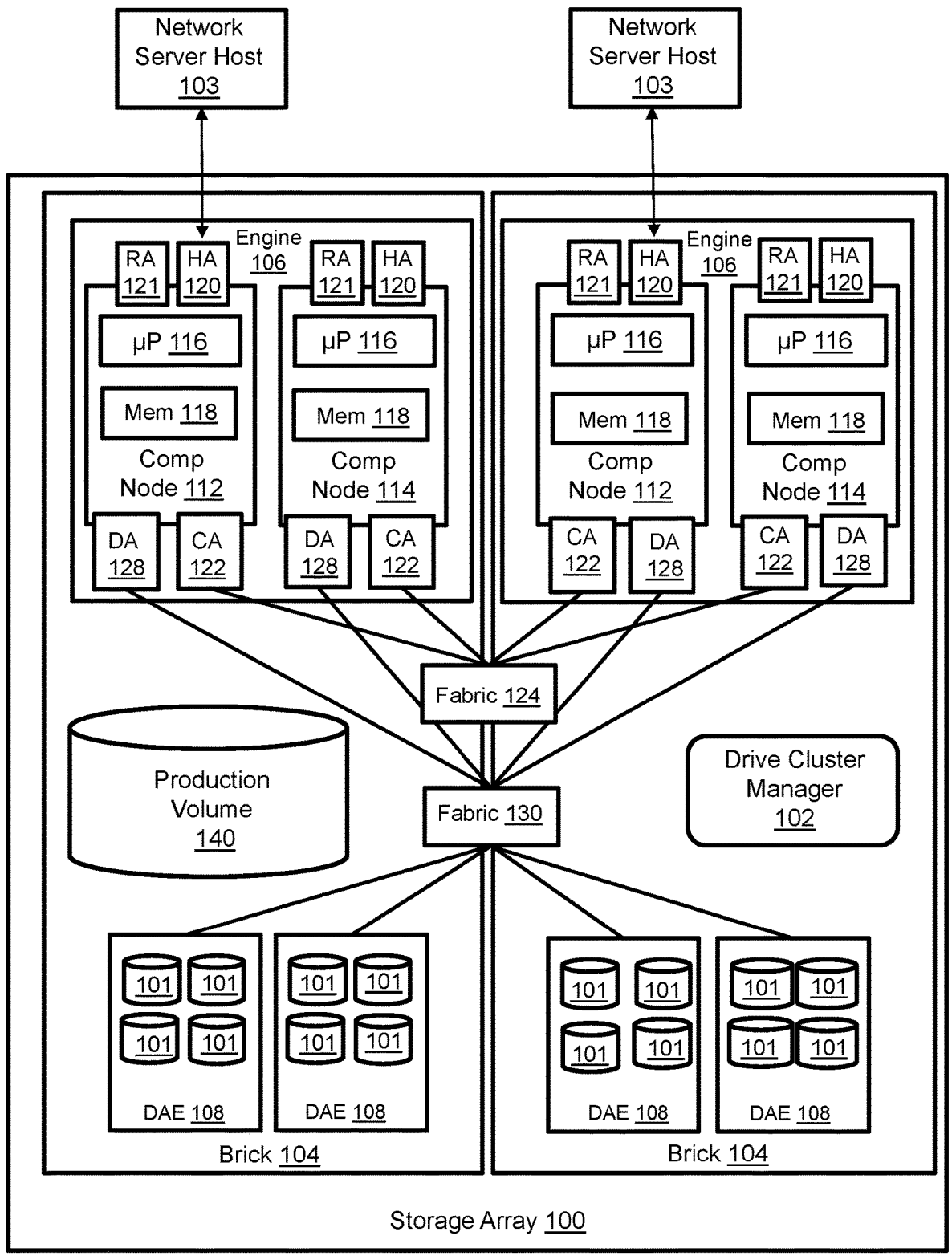
FIG. 1 illustrates a storage array with a drive cluster manager that reorganizes drives and RAID members to split a drive array cluster during capacity expansion.

FIG. 1 illustrates a storage array with a drive cluster manager that reorganizes drives and RAID members to split a drive array cluster during capacity expansion. Each drive cluster managed by the drive cluster manager 102 is scalable in single drive increments and can be split into multiple drive clusters when enough drives have been added. The storage array 100 is one example of a storage area network (SAN), which is one example of a data storage system in which the drive cluster manager could be implemented. The storage array 100 is depicted in a simplified data center environment supporting two network server hosts 103 that run host applications. The hosts 103 include volatile memory, non-volatile storage, and one or more tangible processors. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the hosts 103. Each host adapter has resources for servicing input-output commands (IOs) from the hosts. The host adapter resources may include processors, volatile memory, and ports via which the hosts may access the storage array. Each compute node also includes a remote adapter (RA) 121 for communicating with other storage systems. Each compute node also includes one or more drive adapters (DAs) 128 for communicating with managed drives 101 in the DAEs 108. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on electrically erasable programmable read-only memory (EEPROM) technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. A back-end connection group includes all drive adapters that can access the same drive or drives. In some implementations every drive adapter 128 in the storage array can reach every DAE via the fabric 130. Further, in some implementations every drive adapter in the storage array can access every managed drive 101.

Data associated with the host application instances running on the hosts 103 is maintained on the managed drives 101 of the storage array. The managed drives 101 are not discoverable by the hosts but the storage array creates a logical storage device referred to herein as a production volume 140 that can be discovered and accessed by the hosts. Without limitation, the production volume may also be referred to as a storage object, source device, production device, or production LUN, where the logical unit number (LUN) is a number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is stored at non-contiguous addresses on various managed drives 101. The compute nodes maintain metadata that maps between the production volume 140 and the managed drives 101 in order to process IOs from the hosts. Broadly, a compute node uses the metadata to identify and access address space on the managed drives in response to IOs from hosts that reference LBAs of the production volume.

In order for the metadata to be efficiently manageable a single fixed size "allocation unit" of storage capacity is used by the compute nodes 112, 114 for accessing the managed drives 101. For example, and without limitation, the compute nodes may only read and write from and to the managed drives using fixed size back-end tracks (BE TRKs). BE TRKs should not be confused with "tracks" that are related to HDD architecture. A "sector" is the smallest unit of storage that an HDD can process. An HDD track corresponds to a concentric band on a disk and a sector is a portion of one of those concentric bands, e.g. 1 track may have 32 sectors. BE TRKs can be significantly larger in size than HDD tracks and are not limited by the physical architecture of a spinning disk. The BE TRK size for a storage array is selected as a design choice and is generally proportional to the manageability of the metadata, but inversely proportional to resource utilization efficiency.

Figure 2:
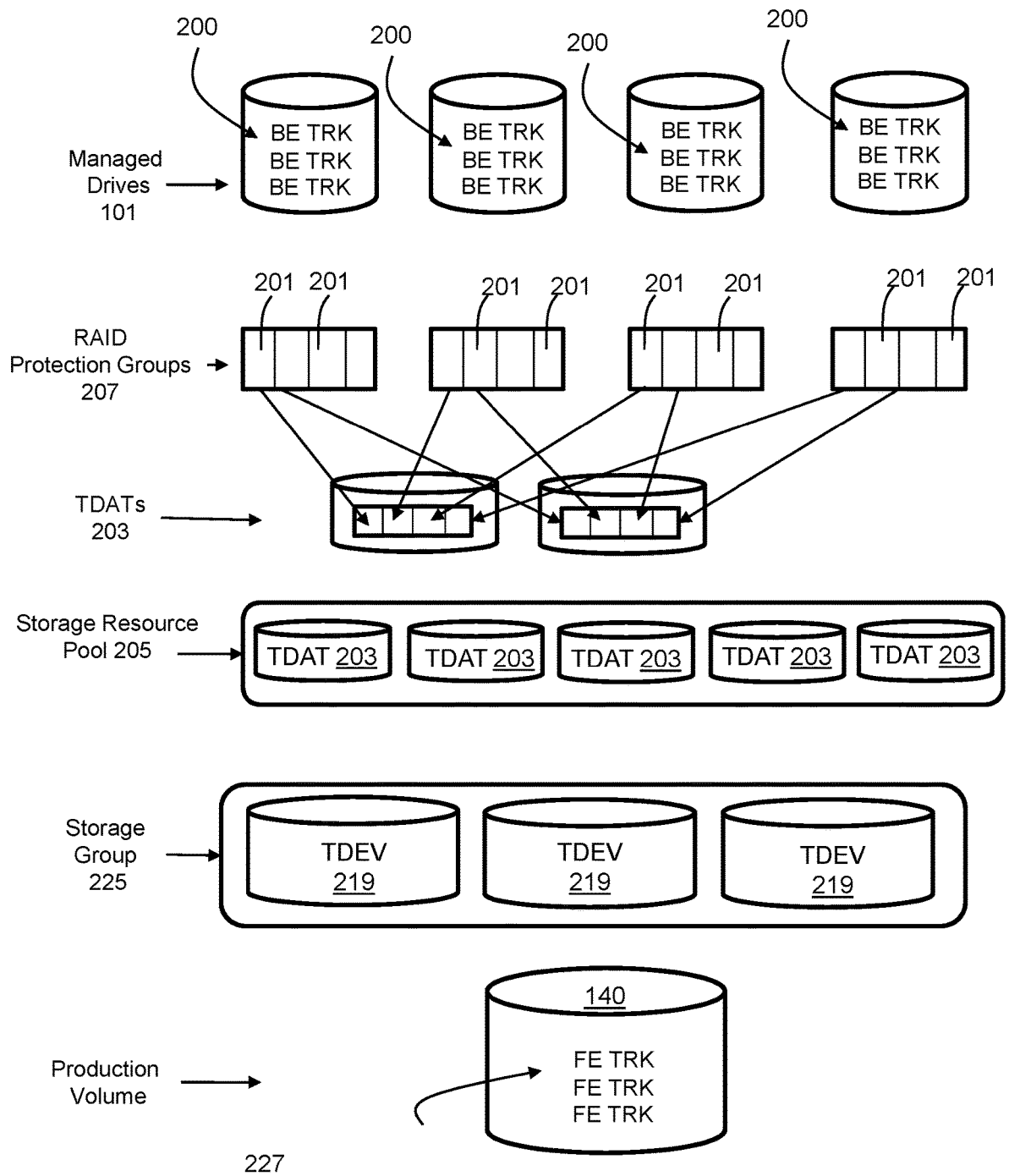
FIG. 2 illustrates layers of abstraction between the managed drives and the production volume of the storage array of FIG. 1.

FIG. 2 illustrates layers of abstraction between the managed drives 101 and the production volume 140. As mentioned above, the basic allocation unit of storage capacity that is used by the compute nodes to access the managed drives 101 is a back-end track (BE TRK) 200. In other words, the compute nodes do not access the managed drives using allocation units other than BE TRKs. BE TRKs all have the same fixed size which may be an integer multiple of the managed drive sector size. The managed drives 101 are each organized into partitions (aka splits) 201 of equal storage capacity, i.e. every partition has the same fixed size. Each partition 201 may include multiple BE TRKs 200. Selection of partition storage capacity is a design implementation and, for context and without limitation, may be some fraction or percentage of the capacity of a managed drive equal to an integer multiple of the sector size. Each partition may include a contiguous range of logical addresses. Groups of partitions that include partitions from different managed drives are used to create RAID protection groups 207. The RAID protection groups are distributed on data devices (TDATs) 203. A storage resource pool 205, also known as a "data pool" or "thin pool," is a collection of TDATs 203 of the same emulation and RAID protection group type, e.g. RAID-5. In some implementations all TDATs in a drive group (aka drive cluster) are of a single RAID protection group type and all have the same size (storage capacity). Logical thin devices (TDEVs) 219 are created using TDATs. The TDATs and TDEVs are accessed using BE TRKs as the allocation unit. Multiple TDEVs 219 are organized into a storage group 225. The production volume 140 is created from one or more storage groups. Host application data is stored in front-end tracks (FE TRKs) 227, that may be referred to as blocks, on the production volume 140. The FE TRKs 227 on the production volume 140 are mapped to BE TRKs 200 of the managed drives 101 by the metadata.

Figure 3:
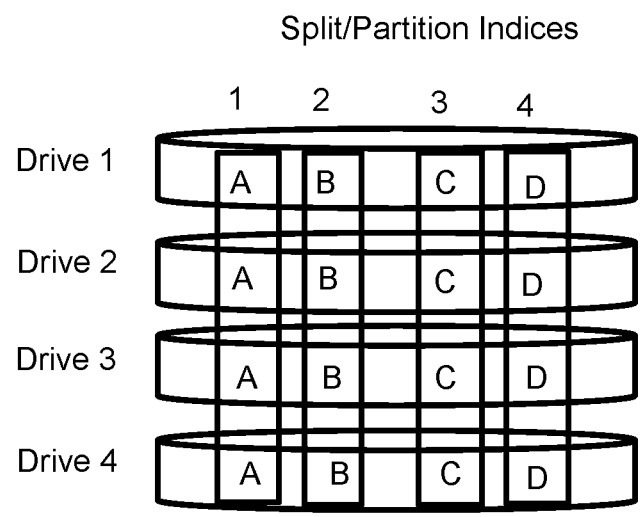
FIG. 3 illustrates an implementation of multiple RAID (3+1) protections groups on partitions of a cluster of the managed drives.

FIG. 3 illustrates an implementation of multiple RAID (3+1) protections groups on partitions of a drive cluster 250. Drive cluster 250 is a subset of the managed drives and the storage array may include multiple drive clusters. RAID (3+1) is used to provide context and should not be viewed as limiting. The illustrated drive cluster 250, which will be referred to as the original drive cluster, includes W drives with W partitions where W=D+P. For the illustrated RAID (3+1) implementation W=4 so there are four drives (Drive 1 through Drive 4) each having four partitions numbered 1-4. Protection groups are created within each partition index. A first protection group A includes the four members in partition 1 of drives 1-4. A second protection group B includes the four members in partition 2 of drives 1-4. A third protection group C includes the four members in partition 3 of drives 1-4. A fourth protection group D includes the four members in partition 4 of drives 1-4.

FIG. 4A is a matrix representation of the drive cluster of FIG. 3. Rows 1-4 represent Drive 1 through Drive 4. Columns 1-4 represent partition indices 1-4. Locations within the matrix represent the partitions on the drives. Matrix representations will be used hereafter to illustrate and describe scaling, splitting, and redistribution.

FIGS. 4B, 5A, and 5B illustrate expansion of the original drive cluster with a first new drive designated as Drive 5. As specifically shown in FIG. 4B the new drive is formatted with the same number and size partitions as the other drives of the drive cluster. Protection group members may be selected for redistribution from consecutively numbered partition indices and drives to facilitate future scaling and splitting of the cluster. As shown in FIG. 5A, protection group members are redistributed by moving one protection group member per row (2 to W) to new row (W+1). More specifically, protection group members are relocated to create free partitions in a diagonal that begins with the first partition (partition 1) of the new drive and includes adjacent partitions characterized by incremented partition numbers and decremented drive numbers. Consequently, each protection group member moved to the new row comes from a different column, where each column represents a different protection group. "Redistributed" may mean copied or moved to the correspondingly indexed partition of the new drive. In the illustrated example the protection group member B at partition 2 of drive 4 is moved to partition 2 of drive 5, the protection group member C at partition 3 of drive 3 is moved to partition 3 of drive 5, and the protection group member D at partition 4 of drive 2 is moved to partition 4 of drive 5. The result is a diagonally oriented group of vacated or empty partitions that facilitates efficient addition of protection groups and drives in successive iterations of scaling. As specifically illustrated in FIG. 5B, a new protection group E is created using the partitions that were freed by redistribution of selected protection group members, i.e. members of protection group E are stored in the diagonally oriented group set of partitions.

FIGS. 6A, 6B, and 7A illustrate expansion of the drive cluster with a second new drive designated as Drive 6. As specifically shown in FIG. 6A the new drive is formatted with the same number and size partitions as the other drives of the drive cluster. As shown in FIG. 6B, protection group members are redistributed by moving one protection group member per row (2 to W) to new row (W+2), thereby creating free partitions in a diagonal that begins with the first partition (partition 1) of the new drive and includes adjacent partitions characterized by incremented partition numbers and decremented drive numbers. In the illustrated example the protection group member B at partition 2 of drive 5 is moved to partition 2 of drive 6, the protection group member C at partition 3 of drive 4 is moved to partition 3 of drive 6, and the protection group member D at partition 4 of drive 3 is moved to partition 4 of drive 6. The result is a diagonally oriented group of vacated or empty partitions. As specifically illustrated in FIG. 7A, a new protection group F is created using the partitions that were freed by redistribution of selected protection group members.

FIGS. 7B, 8A, and 8B illustrate expansion of the drive cluster with a third new drive designated as Drive 7. As shown in FIG. 7B the new drive is formatted with the same number and size partitions as the other drives of the drive cluster. As shown in FIG. 8A, protection group members are redistributed by moving one protection group member per row (2 to W) to new row (W+3), thereby creating free partitions in a diagonal that begins with the first partition (partition 1) of the new drive and includes adjacent partitions characterized by incremented partition numbers and decremented drive numbers. In the illustrated example the protection group member B at partition 2 of drive 6 is moved to partition 2 of drive 7, the protection group member C at partition 3 of drive 5 is moved to partition 3 of drive 7, and the protection group member D at partition 4 of drive 4 is moved to partition 4 of drive 7. The result is a diagonally oriented group of vacated or empty partitions. As illustrated in FIG. 8B, a new protection group G is created using the partitions that were freed by redistribution of selected protection group members.

FIG. 9A illustrates expansion of the drive cluster with a fourth new drive designated Drive 8 that enables the drive cluster to be split. The drive cluster has enough drives to split when there are 2*W drives. In the illustrated example W=4 so the addition of Drive 8 results in a drive cluster of eight drives which can be split into two new drive clusters each having four drives. The new drive is formatted with the same number and size partitions as the other drives of the drive cluster. However, the partitions of the new drive may remain free during the split operation to facilitate redistribution as will be explained below.

FIG. 9B illustrates two smaller drive clusters that result from splitting the larger drive cluster of FIG. 9A. A first drive cluster 252 is formed by selecting and splitting away the sequentially numbered drives (W/2)+1 to (W/2)+W. If (W/2) is not an integer value, then W/2 is rounded down to the nearest integer value. Throughout the present disclosure the expression W/2 is intended to include both rounded and unrounded integer values. In the illustrated example W=4 so the first drive cluster 252 consists of Drive 3, Drive 4, Drive 5, and Drive 6. A second drive cluster 254 consists of the remaining drives which are Drive 1, Drive 2, Drive 7, and Drive 8 in the illustrated example. As will be explained below, splitting the drives in the illustrated manner facilitates recreation of the original drive cluster.

FIGS. 10A, 10B, and 11 illustrate reorganization of RAID members to prepare one of the smaller drive clusters for scaling and splitting. Specifically, the original drive cluster 250 (FIGS. 3 and 4A) is recreated using the second drive cluster 254 (FIG. 9B). This is accomplished by redistributing protection group members to recreate the single partition protection groups which are protections groups A, B, C, and D in the illustrated example. Instances of the single partition protection group members that can be moved directly into free partitions in the appropriate partition index are selected and moved first. In the illustrated example the protection group members A and B on partitions 1 and 2 of drive 1 are moved to partitions 1 and 2 of drive 8. Similarly, the protection group members C and D on partitions 3 and 4 of drive 6 are moved to partitions 3 and 4 of drive 8. When no free space remains on the second drive cluster 254 then protection group members that are not needed to recreate the single partition protection groups are moved from the second drive cluster 254 to the first drive cluster 252. In the illustrated example the protection group member E at partition 4 of drive 2 is moved to partition 4 of drive 6 and the protection group member G at partition 1 of drive 7 is moved to partition 1 of drive 3. The destinations on the first drive cluster may be selected to create symmetrical distribution of the protection group members and also to prevent more than one member of any protection group from residing on a single drive because that is a basic requirement for protection groups. As shown in FIG. 10B the protection group members are relocated to create protection groups along diagonals. Having freed the partitions on the second drive cluster 254 from unneeded protection group members the remaining needed protection group members are moved from the first drive cluster 252 to the second drive cluster 254. In the illustrated example the protection group member D at partition 4 of drive 5 is moved to partition 4 of drive 2 and the protection group member A at partition 1 of drive 4 is moved to partition 1 of drive 7 as shown in FIG. 11. At that point the second drive cluster 254 has the same distribution of protection group members as the original drive cluster 250 (FIGS. 3 and 4A). Note that "recreation" of the original drive cluster only implies that the distribution of protection groups is recreated; the data may have been updated and individual members within a protection group may be in different locations. Therefore, drive cluster 254 can be scaled and split in the same manner as the original drive cluster. The free partitions in the first drive cluster may be used to create a new protection group or maintained as spares.

FIGS. 12, 13, 14, 15, and 16 illustrate a drive cluster with multiple RAID (6+1) protections groups being scaled, split and reorganized during capacity expansion. As shown in FIG. 12 an original drive cluster of seven drives with seven partitions has been scaled up by five new drives. The cluster of twelve drives is made ready for splitting with the addition of two new drives designated as Drive 13 and Drive 14. Selecting and splitting away the sequentially numbered drives (W/2)+1 to (W/2)+W yields drive cluster 262. Remaining drives 1, 2, 3, 11, 12, 13, and 14 form drive cluster 264. The original single partition protection groups A through G are recreated on drive cluster 264. Protection group members A through D on partitions 1 through 4 of drive 4 are relocated to partitions 1 through 4 of drive 13. Protection group members A through C on partitions 1 through 3 of drive 5 are relocated to partitions 1 through 3 of drive 14. Protection group members E through G on partitions 5 through 7 of drive 9 are relocated to partitions 5 through 7 of drive 13. Protection group members D through G on partitions 4 through 7 of drive 10 are relocated to partitions 4 through 7 of drive 14. The vacated partitions enable protection group members K and L on drives 11-12 to be relocated to drives 4-5. In parallel, protection group members H and I on drives 2-3 are relocated to drives 9-10. Subsequently, protection group members A and B on drives 6-7 are relocated to drives 11-12, and protection group members F and G are relocated to drives 2-3. The two drives clusters are then independent with self-contained non-overlapping RAID groups. Drive cluster 266 may become the starting point of the next capacity expansion cycle. Drive cluster 268 has space for two new RAID groups M and N and is not be involved in further capacity expansion.

Figure 17:
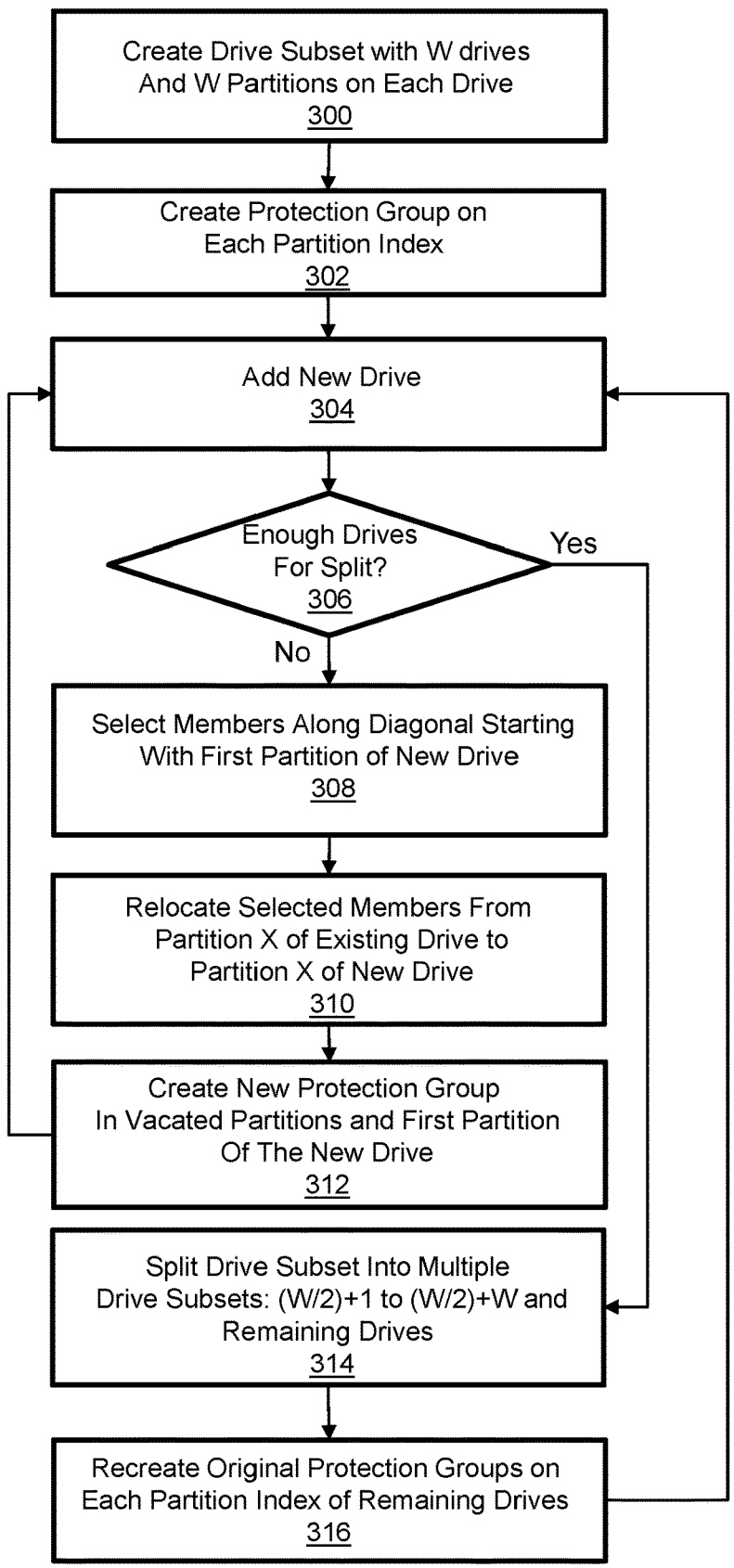
FIG. 17 illustrates a method of reorganizing drives and RAID members to split a drive array cluster during capacity expansion.

FIG. 17 illustrates a method of reorganizing drives and RAID members to split a drive array cluster during capacity expansion. A drive cluster for implementation of RAID (D+P) protection groups is created with W=D+P drives that each have W partitions as indicated in step 300. A storage array may include a plurality of such drive clusters but scaling and splitting from one drive cluster will be described. Step 302 is creating a protection group at each partition index of the drive cluster. For example, the partitions may be sequentially numbered from 1 to W and partition 1 of each drive would contain the members of a first protection group, partition 2 of each drive would contain the members of a second protection group, partition 3 of each drive would contain the members of a third protection group, and so forth. Such protection groups may be referred to as single partition protection groups because all members reside on the same partition number of different drives. The distribution of protection groups in the partitions of the resulting drive cluster is referred to as the "initial" or "original" drive cluster distribution or partition assignments. Step 304 is adding a new drive. New drives may be added in response to a need for additional storage capacity. Consequently, any amount of time may elapse between step 304 and a preceding step. Although adding a single new drive is described for context, in some instances multiple drives may be added contemporaneously. The new drive is sequentially numbered with the drives of the existing cluster. Step 306 is determining if there are enough drives in the drive cluster to support a split. Generally, at least 2*W drives are required to create two independent drive clusters of W drives each. If there are not enough drives for a split, then step 308 is selecting protection group members along a diagonal starting with the first partition of the new drive and characterized by decrementing drive numbers and incrementing partition numbers. Step 310 is relocating the selected protection group members. The selected protection group members are relocated within their partitions such that a selected protection group member on partition X of an existing drive is located to partition X of the new drive. Step 312 is creating a new protection group in the vacated partitions and the first partition of the new drive. Step 312 is followed by step 304 in which another new drive is added. When addition of a new drive results in enough drives for a split as determined in step 306 then the drive cluster is split into two smaller drive clusters each having W drives. A first of the smaller drive clusters includes sequentially numbered drives (W/2)+1 to (W/2)+W. A second of the smaller drive clusters includes the remaining drives. The protection group distribution of the original drive cluster is recreated on the second of the smaller drive clusters that includes the remaining drives as indicated in step 316. The second of the smaller drive clusters that includes the remaining drives may then be scaled up by adding a new drive as indicated in step 304, and eventually be split. The first of the smaller drive clusters that includes sequentially numbered drives (W/2)+1 to (W/2)+W may be maintained with W drives and the free partitions may be used as spares or populated with new protection group members.

Figure 18:
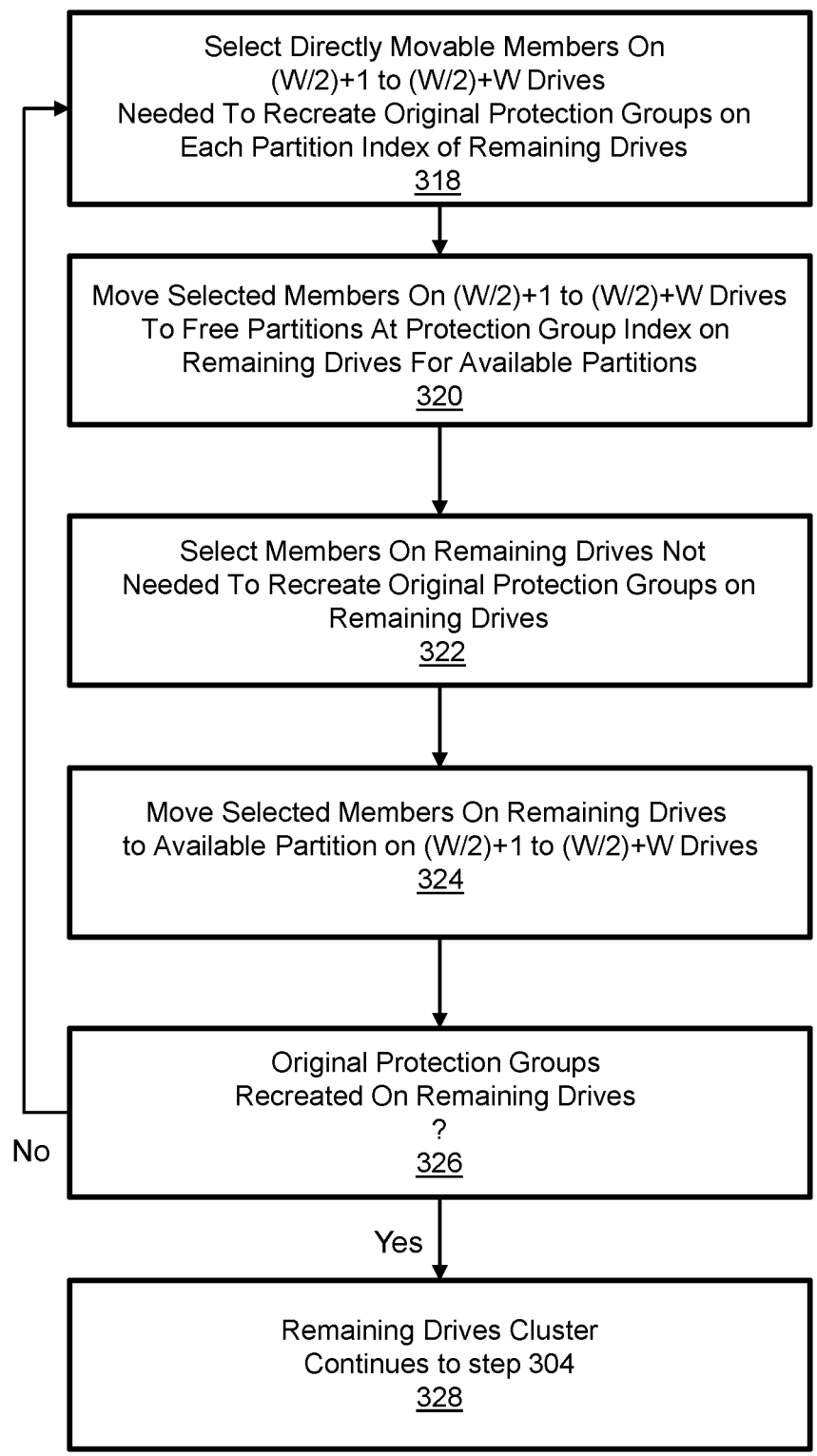
FIG. 18 illustrates recreation of the protection groups of the original drive cluster in greater detail.

FIG. 18 illustrates recreation of the distribution of protection groups of the original drive cluster in greater detail. Step 318 is selecting protection group members that are: (1) members of the original drive cluster; (2) on the first of the smaller drive clusters that includes sequentially numbered drives (W/2)+1 to (W/2)+W; and (3) can be directly relocated to free space in the appropriate partition of the second of the smaller drive clusters that includes the remaining drives. For example, if protection group A is being recreated at partition 1 and a free partition already exists in partition 1 of one of the drives of the second of the smaller drive clusters then one of the members of protection group A can be directly relocated from the first of the smaller drive clusters into that free space at partition 1 on the second of the smaller drive clusters so that protection group member is selected. Step 320 is relocating the selected protection group members from the first of the smaller drive clusters to the appropriate partitions of the second of the smaller drive clusters. Step 322 is selecting the protection group members on the second of the smaller drive clusters that are not needed to recreate the original drive cluster on the second of the smaller drive clusters. Step 324 is relocating the selected protection group members from the second of the smaller drive clusters to free space on the first of the smaller drive clusters. The distribution of protection groups will likely not have been recreated yet as determined in step 326 so step 318 is repeated using the partition vacated pursuant to step 324. Steps 318 through 324 may be iterated any number of times until the distribution of protection groups on the original drive cluster has been recreated. Once the original drive cluster has been recreated on the second of the smaller drive clusters then that smaller drive cluster can be scaled and split in the same manner as the original drive cluster. The first of the smaller drive clusters will include free partitions that can be used to create at least one more protection group.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
at least one compute node comprising a processor and non-transitory memory;
drives that are managed by the at least one compute node; and
a drive cluster manager configured to:
sequentially number a first cluster of W of the drives,
organize each of the W drives into W partitions each having a fixed-size amount of storage capacity equal to storage capacity of other partitions of the first cluster,
implement redundant arrays of independent drives (RAID) protection groups on the drives, each RAID protection group having D data members and P parity members, where W is set equal to the sum of D and P, and the data members and parity members have an initial distribution to the partitions such that each partition of the first cluster contains members of a single RAID protection group,
scale the first cluster at least until there are 2*W drives, and split the scaled first cluster into a first smaller cluster that comprises sequentially numbered drives (W/2)+1 to (W/2)+W and a second smaller cluster that comprises remaining drives, and
adapt the second smaller cluster for scaling by adding more new drives.

2. The apparatus of claim 1 comprising the drive cluster manager being configured to select RAID protection group members starting with a first partition of the new drive and characterized by decrementing drive numbers and incrementing partition numbers, relocate the selected RAID protection group members within partitions such that a selected RAID protection group member on partition X of an existing drive is relocated to partition X of the new drive, and create a new protection group in vacated partitions and the first partition of the new drive, where X is a partition index.

3. The apparatus of claim 2 comprising the drive cluster manager being configured to relocate RAID protection group members between the first smaller cluster that comprises sequentially numbered drives (W/2)+1 to (W/2)+W and the second smaller cluster that comprises the remaining drives until the second smaller cluster has the initial distribution of the first cluster.

4. The apparatus of claim 3 comprising the drive cluster manager being configured to select a first set of RAID protection group members that are: members of the initial distribution of the first cluster; on the first smaller drive clusters that includes sequentially numbered drives (W/2)+1 to (W/2)+W; and can be directly relocated to free space on the second smaller drive cluster that comprises the remaining drives in accordance with the initial distribution of the first cluster.

5. The apparatus of claim 4 comprising the drive cluster manager being configured to relocate the selected first set of RAID group members to the second smaller drive cluster in accordance with the initial distribution of the first cluster.

6. The apparatus of claim 5 comprising the drive cluster manager being configured to select a second set of RAID protection group members that are: not members of the initial distribution of the first cluster and are on the second smaller drive cluster that comprises the remaining drives.

7. The apparatus of claim 6 comprising the drive cluster manager being configured to relocate the selected second set of RAID group members to the first smaller drive cluster.

8. The apparatus of claim 7 comprising the drive cluster manager being configured to select remaining RAID protection group members that are members of the first drive cluster and on the first smaller drive cluster and relocate the selected remaining protection group members to free space on the second smaller drive cluster in accordance with the initial distribution of the first cluster.

9. A method for scaling storage capacity of a storage array that comprises at least one compute node comprising a processor and non-transitory memory and drives that are managed by the at least one compute node, the method comprising:
sequentially numbering a first cluster of W of the drives;
organizing each of the W drives into W partitions each having a fixed-size amount of storage capacity equal to storage capacity of other partitions of the first cluster;
implementing redundant arrays of independent drives (RAID) protection groups on the drives, each RAID protection group having D data members and P parity members, where W is set equal to the sum of D and P, and the data members and parity members have an initial distribution to the partitions such that each partition of the first cluster contains members of a single RAID protection group;
scaling the first cluster at least until there are 2*W drives;
splitting the scaled first cluster into a first smaller cluster that comprises sequentially numbered drives (W/2)+1 to (W/2)+W and a second smaller cluster that comprises remaining drives; and
adapting the second smaller cluster for scaling by adding more new drives.

10. The method of claim 9 comprising selecting RAID protection group members starting with a first partition of the new drive and characterized by decrementing drive numbers and incrementing partition numbers, relocating the selected RAID protection group members within partitions such that a selected RAID protection group member on partition X of an existing drive is relocated to partition X of the new drive, and creating a new protection group in vacated partitions and the first partition of the new drive, where X is a partition index.

11. The method of claim 10 comprising relocating RAID protection group members between the first smaller cluster that comprises sequentially numbered drives (W/2)+1 to (W/2)+W and the second smaller cluster that comprises the remaining drives until the second smaller cluster has the initial distribution of the first cluster.

12. The method of claim 11 comprising selecting a first set of RAID protection group members that are: members of the initial distribution of the first cluster; on the first smaller drive clusters that includes sequentially numbered drives (W/2)+1 to (W/2)+W; and can be directly relocated to free space on the second smaller drive cluster that comprises the remaining drives in accordance with the initial distribution of the first cluster.

13. The method of claim 12 comprising relocating the selected first set of RAID group members to the second smaller drive cluster in accordance with the initial distribution of the first cluster.

14. The method of claim 13 comprising selecting a second set of RAID protection group members that are: not members of the initial distribution of the first cluster and are on the second smaller drive cluster that comprises the remaining drives.

15. The method of claim 14 comprising relocating the selected second set of RAID group members to the first smaller drive cluster.

16. The method of claim 15 comprising selecting remaining RAID protection group members that are members of the first drive cluster and on the first smaller drive cluster and relocating the selected remaining protection group members to free space on the second smaller drive cluster in accordance with the initial distribution of the first cluster.

17. A non-transitory computer-readable storage medium storing instructions that when executed by a compute node of a storage array cause the storage array to perform a method for scaling storage capacity of the storage array, the method comprising:
sequentially numbering a first cluster of W drives;
organizing each of the W drives into W partitions each having a fixed-size amount of storage capacity equal to storage capacity of other partitions of the first cluster;
implementing redundant arrays of independent drives (RAID) protection groups on the drives, each RAID protection group having D data members and P parity members, where W is set equal to the sum of D and P, and the data members and parity members have an initial distribution to the partitions such that each partition of the first cluster contains members of a single RAID protection group;
scaling the first cluster at least until there are 2*W drives;
splitting the scaled first cluster into a first smaller cluster that comprises sequentially numbered drives (W/2)+1 to (W/2)+W and a second smaller cluster that comprises remaining drives; and
adapting the second smaller cluster for scaling by adding more new drives.

18. The non-transitory computer-readable storage medium of claim 17 wherein the method further comprises relocating RAID protection group members between the first smaller cluster that comprises sequentially numbered drives (W/2)+1 to (W/2)+W and the second smaller cluster that comprises the remaining drives until the second smaller cluster has the initial distribution of the first cluster, where X is a partition index.

19. The non-transitory computer-readable storage medium of claim 18 wherein the method further comprises:
selecting a first set of RAID protection group members that are: members of the initial distribution of the first cluster; on the first smaller drive clusters that includes sequentially numbered drives $(W/2)+1$ to $(W/2)+W$; and can be directly relocated to free space on the second smaller drive cluster that comprises the remaining drives in accordance with the initial distribution of the first cluster; and
relocating the selected first set of RAID group members to the second smaller drive cluster in accordance with the initial distribution of the first cluster.

20. The non-transitory computer-readable storage medium of claim 19 wherein the method further comprises:
selecting a second set of RAID protection group members that are: not members of the initial distribution of the first cluster and are on the second smaller drive cluster that comprises the remaining drives;
relocating the selected second set of RAID group members to the first smaller drive cluster; and
selecting remaining RAID protection group members that are members of the first drive cluster and on the first smaller drive cluster and relocating the selected remaining protection group members to free space on the second smaller drive cluster in accordance with the initial distribution of the first cluster.

* * * * *